United States Patent [19]

Kinzie

[11] 4,311,995
[45] Jan. 19, 1982

[54] SIEVE OVERLOAD SENSOR FOR ALERTING THE OPERATOR OF A COMBINE OF A SIEVE OVERLOAD CONDITION

[75] Inventor: George R. Kinzie, Acton, Mass.

[73] Assignee: Sperry Corporation, New York, N.Y.

[21] Appl. No.: 97,181

[22] Filed: Nov. 23, 1979

Related U.S. Application Data

[63] Continuation of Ser. No. 884,098, Mar. 6, 1978.

[51] Int. Cl.³ ............... G08B 21/00; A01D 45/18
[52] U.S. Cl. .................... 340/684; 340/607
[58] Field of Search .......... 340/684, 607, 611, 606, 340/608, 603

[56] References Cited

U.S. PATENT DOCUMENTS

| | | | |
|---|---|---|---|
| 3,345,626 | 10/1967 | Thomas | 340/684 |
| 3,563,013 | 2/1971 | Elfes | 340/684 |
| 3,625,402 | 12/1971 | Price | 340/684 |
| 4,068,223 | 1/1978 | Steffen | 340/684 |

*Primary Examiner*—Marshall M. Curtis
*Attorney, Agent, or Firm*—Howard P. Terry

[57] ABSTRACT

Apparatus for indicating, to the operator of a combine, that a sieve overload or blockage has developed comprises wind sensors responsive to the fan air flow within the cleaning section of the harvester. The flow sensor signals are compensated for the ambient temperature within the combine such that they are independent thereof. The apparatus includes a monitor circuit for detecting a low flow indicative of blockage or overload and warning means responsive thereto to alert the operator.

5 Claims, 8 Drawing Figures

SIEVE OVERLOAD SENSOR FOR ALERTING THE OPERATOR OF A COMBINE OF A SIEVE OVERLOAD CONDITION

This is a continuation of application Ser. No. 884,098, filed Mar. 6, 1978.

BACKGROUND OF THE INVENTION

1. Field of the Invention

The present invention relates generally to mobile grain harvesting equipment and, more particularly, to combine harvesters and the like in which means for improving the efficiency of the grain separation or harvesting process is provided.

2. Description of the Prior Art

As mobile combines are harvesting in the field, the grain is threshed and separated from the straw and stored in a storage bin within the combine for later delivery to another vehicle for transport from the field. This is the most economical method for harvesting grain. In general, the harvesting process of all combines is alike, that is, the material harvested enters the combine through a header portion and is elevated through the elevator housing into the threshing and separating units within the combine. The threshing and separating units receive the unthreshed crop material and generally separate the grain from the straw by means of a rubbing or beating motion. The grain and other unthreshed crop material separated from the straw falls from the threshing and separating units onto the grain handling and cleaning means while the straw is discharged from the rear of the threshing and separating units onto a beater element which expels the threshed straw through an opening in the hood of the combine.

The grain handling and cleaning means includes means to separate the light straw material or chaff from the grain and means to segregate the unthreshed material (known in the art as tailings) from the grain in order to collect the clean grain in a grain bin or tank located at the top of the combine. The grain handling and cleaning means is generally conventional and comprises oscillating grain pan and sieves and a fan for the separation process. The grain pan, disposed beneath the threshing and separating units, receives the threshed material therefrom and discharges the threshed material to oscillating sieves disposed rearwardly and below the grain pan. That is, the vibration or oscillation of the grain pan causes the grain and threshed material to move rearwardly to be discharged onto the sieves below and thus subjected to the air flow from the grain handling and cleaning fan. The fan, moreover, blows a sufficient volume of air through the apertures provided in the sieves to aerodynamically separate the grain from the chaff. Accordingly, the chaff and other small trash material are suspended in the airstream and are discharged through a rear opening in the combine while the grain drops to the sieves below. The first sieve or chaffer sieve is provided with means for adjusting the apertures such that the grain received thereon may fall therethrough while the larger trash material is shaken rearwardly for discharge out of the combine. In addition, the second or clean grain sieve disposed beneath the first or chaffer sieve includes adjustable apertures such that only the grain drops therethrough to a guide where it may be collected for elevation to the grain bin. Any larger material (generally known in the art as tailings) discharged onto the lower second sieve is discharged rearwardly and collected within the combine to be elevated and discharged into the feed section of the threshing and separating units for reprocessing of the grain attached thereto. Thus, an excellent separation or cleaning of the grain is obtained along with a separate and rapid discharge of straw, trash and chaff material from the combine.

In certain operating conditions, however, perhaps more often with new high capacity combines wherein a large amount of short straw is produced by the threshing operation and in muddy conditions whereby the mud and straw combination form a coagulated mass, the short straw or coagulated straw-mud mass often overloads the cleaning and handling system. Furthermore, if the harvesting operation is being attempted at too great a load for the cleaning means to handle, the threshed material, including the chaff and straw, overloads the cleaning and handling system. When the sieves become overloaded with chaff and trash straw material or the coagulated straw-mud mass, separation of the grain is not performed and a short straw and chaff material mat forms on the sieves further reducing the separation process. In addition, as the mat is moved rearwardly and discharged from the combine, some of the grain entrained therein is also discharged or lost thereby reducing the economic efficiency of the machine and from a practical viewpoint reducing the over-all yield of the harvest.

It has been noted that during the harvesting operation, a localized straw mat buildup on the sieves effectively causes a localized blockage of the air flow through the sieves reducing the aerodynamic separation produced by the fan. Further, as the flow of air through the sieves is blocked, additional straw and chaff material collapse from the airstream onto the straw mat on the sieve forming a tighter and larger mat which progressively grows along the sieve reducing grain separation and increasing grain loss through the rear of the combine. As the blockage of the sieve increases, the increasing incoming material causes the "collapsed area", that is, the area through the sieves in which there is no air flow, to enlarge. In addition, the tailings returns increase dramatically adding more material to the incoming flow. When the straw mat fills the sieve blocking the front part thereof, pure aerodynamic separation fails and the overload is complete. In this stage, the grain is captured in the collapsed mat and rides over the sieve and is discharged onto the ground.

Accordingly, there is a need to provide means for detecting the overload buildup or a localized blockage of the sieves and to indicate this condition to the operator of the combine.

SUMMARY OF THE INVENTION

According to the invention, apparatus is provided for detecting and alerting the operator of a combine harvester of a sieve overload condition or formation thereof. Illustratively, the apparatus of this invention comprises sensing means disposed within the combine to alert the operator of a sieve blockage or overload condition.

Specifically, the apparatus of this invention comprises a monitor circuit coupled to a sensor disposed within the combine. The sensor is responsive to the air flow through the sieves and provides signals indicative of the flow therethrough and of blocked flow due to sieve blockage or overload. The monitor circuit is responsive to the blockage signal and provides a signal for operation of warning devices to alert the operator.

More specifically, the apparatus of this invention comprises a monitor circuit including equalizing means to balance the sensor signal and to compensate the signal for varying combine internal air temperatures. The monitor circuit further includes a threshold circuit for establishing a predetermined lower limit which if exceeded will be indicative of sieve blockage, and a detector circuit for comparing the wind sensor signals to the lower limit signals for fault or blockage detection. If the detector circuit discovers a fault, a signal is produced which activates the warning devices to alert the operator before full sieve overload is established.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

For a more complete appreciation of the invention, attention is invited to the following description of an illustrative embodiment of the invention. In the following description, this invention is described in association with a self-propelled combine harvester as described hereinabove. It is noted that the direction of travel designated by arrow A (FIG. 1) is opposite to the direction of movement of the crop material through the combine and, as the terms grain and straw are used principally throughout the specification, it should be understood that these terms are not intended to be limiting. The term "grain" as used herein refers to all crop material that may be threshed by the mechanism described herein. Similarly, the term "straw" refers to all discardable crop material.

Figure 1:
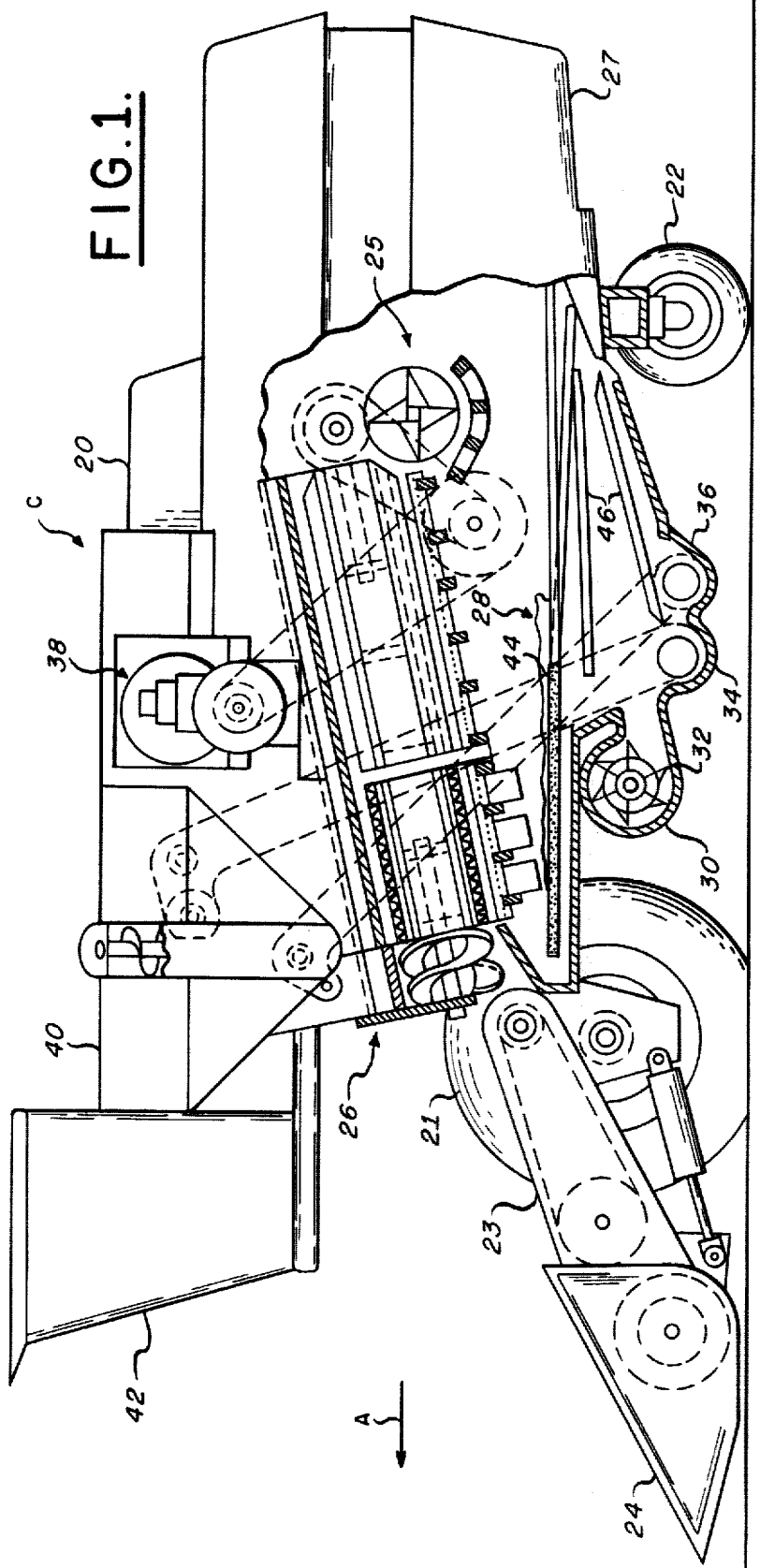
FIG. 1 is a side elevation of a combine harvester, partially in section, that embodies principles of the invention.

The combine harvester illustrated in FIG. 1 includes a mobile main frame or housing means 20 supported on front drive wheels 21 and rear steerable wheels 22, the wheels being traversely spaced apart on opposite sides of the frame. A crop elevator housing 23 and a header 24 are mounted on the front of the main housing 20 to harvest the grain crop and feed it to the threshing and separating units 26 mounted in the main housing 20. The threshing and separating units thresh and separate the grain from the crop material and discharge the grainless crop material (straw) onto a rear beater 25 for discharge from the rear of the combine, generally through a large bottom opening in the hood 27. Grain cleaning means 28 are provided within the main housing for separating the straw and chaff from the grain. An encasement 30 extends below the main frame for housing a fan 32 and the grain and tailings collecting means 34 and 36 respectively. On the top of the combine is an engine 38 and a grain tank 40 with a hinged unloading auger, not shown. An operator's cab 42 is mounted on the front of the housing 20 above the crop elevator housing 23.

As indicated hereinabove, the threshing and separating units 26 separate the grain from the straw and discharge the grain and other crop bearing material onto the cleaning means 28. The cleaning means 28 includes a grain pan 44 and sleves 46 which cooperate with the fan 32 to clean the grain as indicated previously. The sieves 46, however, may develop a localized blockage thereon of straw material which prevents the cleaning means from separating the grain from the discardable material. Furthermore, this localized blockage or overload may increase in size as more material collapses thereon effectively blocking the entire sieve 46.

Figure 2:
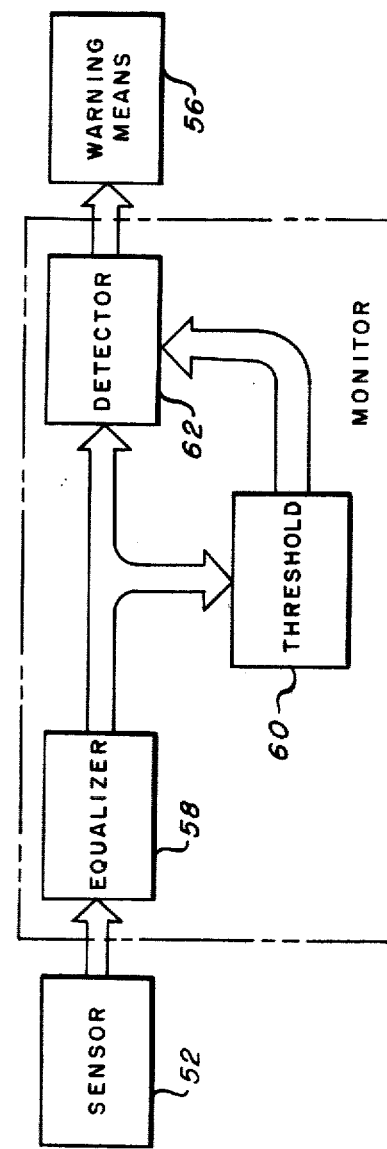
FIG. 2 is a block diagram of the invention.

In accordance with this invention, apparatus 50 (FIG. 2) is provided to indicate to the operator of the combine C that a blockage or sieve overload is developing on the sieves 46 in order that the operator may take effective steps to prevent sieve overload. The apparatus 50 comprises means 52 disposed in cooperation with the air flow from the fan 32 to sense the air flow, a monitor 54 coupled to the sensor means 52 and a warning device 56 coupled and responsive to the monitor to alert the operator of a localized sieve overload or mat-like development on the sieves. As indicated in FIG. 2, the monitor 54 comprises an equalizing means 58 coupled to the sensing means 52 for balance and compensation as further explained herein. The monitor further comprises a threshold means 60 coupled to equalizing means 58 and a detector means 62, the detector means 62 being coupled to both the equalizing means 58 and the threshold means 60.

In the preferred embodiment of this invention, the sensor means 52 is disposed in the air flow from the fan 32 and, more specifically, in the vicinity of the rear portion of the sieves 46. Attention is invited to FIG. 3 in which is shown an isometric blow up view of the threshing and separating units 26, cleaning means 28 including fan 32, grain pan 44 and sieves 46. In this embodiment of the invention, the sieves 46 are separated into a plurality of longitudinal (with respect to the combine C) sections, for example, $S_1$ through $S_6$, and the sieves $S_1$ through $S_6$ are separated by vertical slats such as dividers 47. Within each section ($S_1$-$S_6$) a wind sensor 64 (only one being so numbered) of sensing means 52 is disposed in the air flow passing through the cleaning sieves 46. Furthermore, although other locations for and combinations of sensors are possible, in the preferred embodiment of this invention, the wind sensors 64 are disposed transversely across the rear portion of the sieves 46 (one to each section $S_1$-$S_6$) as it has been found that the initial localized blockage of the sieves occurs within this rear portion thereof. The wind sensors 64 are attached to the underside of the sieve within the air flow from the fan 32 such that it can sense the air passing through the sieve without being disturbed by the crop material itself.

In the preferred embodiment of this invention, the wind sensor 64 comprises a D.C. powered positive temperature coefficient thermistor 64a which provides a signal indicative of the wind or air flow from the fan 32 through the sieve sections ($S_1$-$S_6$) of each respective thermistor by means of the heat transfer from the thermistor. A particularly useful characteristic of a positive temperature coefficient (PTC) thermistor, as applied to this invention, is that the resistance of the PTC thermistor increases so rapidly at its characteristic or operating temperature that the PTC thermistor seeks an equilibrium near that characteristic temperature substantially independent of the heat loss from the surface of the thermistor. In a "high" wind condition or for this invention a clean sieve, for example, the PTC thermistor maintains the characteristic operating temperature by means of a lower electrical resistance which draws more electrical power, balancing the heat loss. Correspondingly, in a "low" wind, sieve blockage condition, the PTC thermistor resistance increases and the higher electrical resistance reduces the electrical power to match the lower heat loss. Although the PTC thermistor temperature is slightly higher in the "low" wind condition, wind conditions hardly affect or change the characteristic or operating temperature due to the rapid change in resistance with temperature of the PTC device. It is noted, moreover, that the current through the PTC thermistor varies substantially with the wind conditions and at a constant supply voltage the current is proportional to the heat loss from the thermistor, as further explained herein. Thus, it is noted that a positive temperature coefficient thermistor is a sensor which seeks a certain operating temperature or maximum temperature which substantially will not vary at different supply voltage levels or as the heat transfer therefrom increases or decreases. Accordingly, a positive temperature coefficient thermistor $64a$ offers a safety feature not found in other types of self-heated heat transfer wind sensors, such as a hot-wire aneomometer. That is, as the power supplied to the sensor increases, the temperature thereof remains substantially constant at its maximum operating temperature, which may be selected in advance as a temperature substantially below the ignition temperature of the material within the combine, thereby preventing a disaster which could occur if other type self-heated or heat transfer sensors were used.

Figure 3:
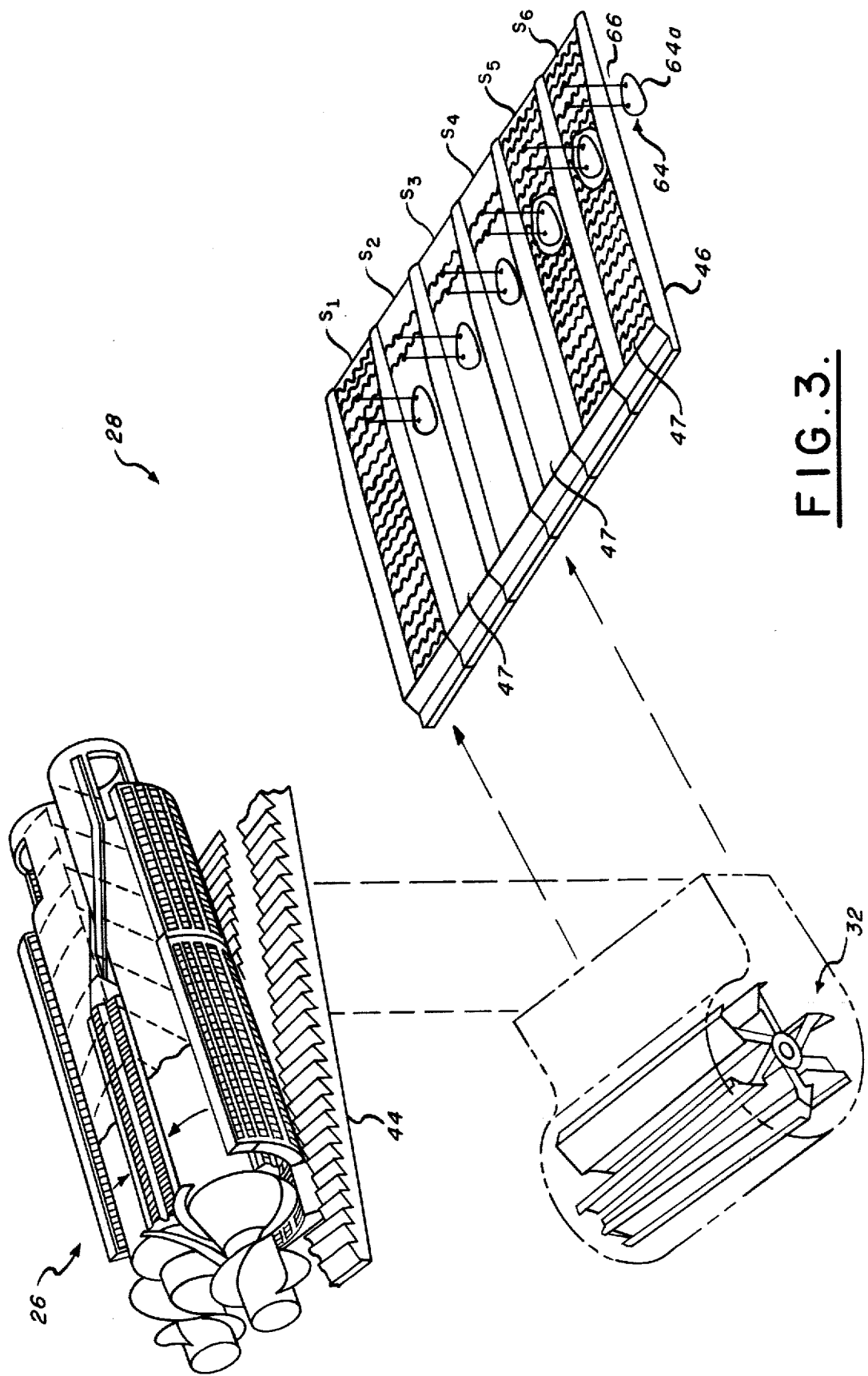
FIG. 3 is a blown up view of a portion of the internals of the combine of FIG. 1 showing the preferred location of a portion of this invention.

In the preferred embodiment shown in FIG. 3, the sensor means 64 is attached to or mounted on the lower portion of the sieve 46 through insulation means 66, such as a mylar plastic, which effectively insulates the thermistor $64a$ from the sieve while securely fixing the thermistor within its respective sieve section ($S_1-S_6$) and within the air flow.

Figure 4:
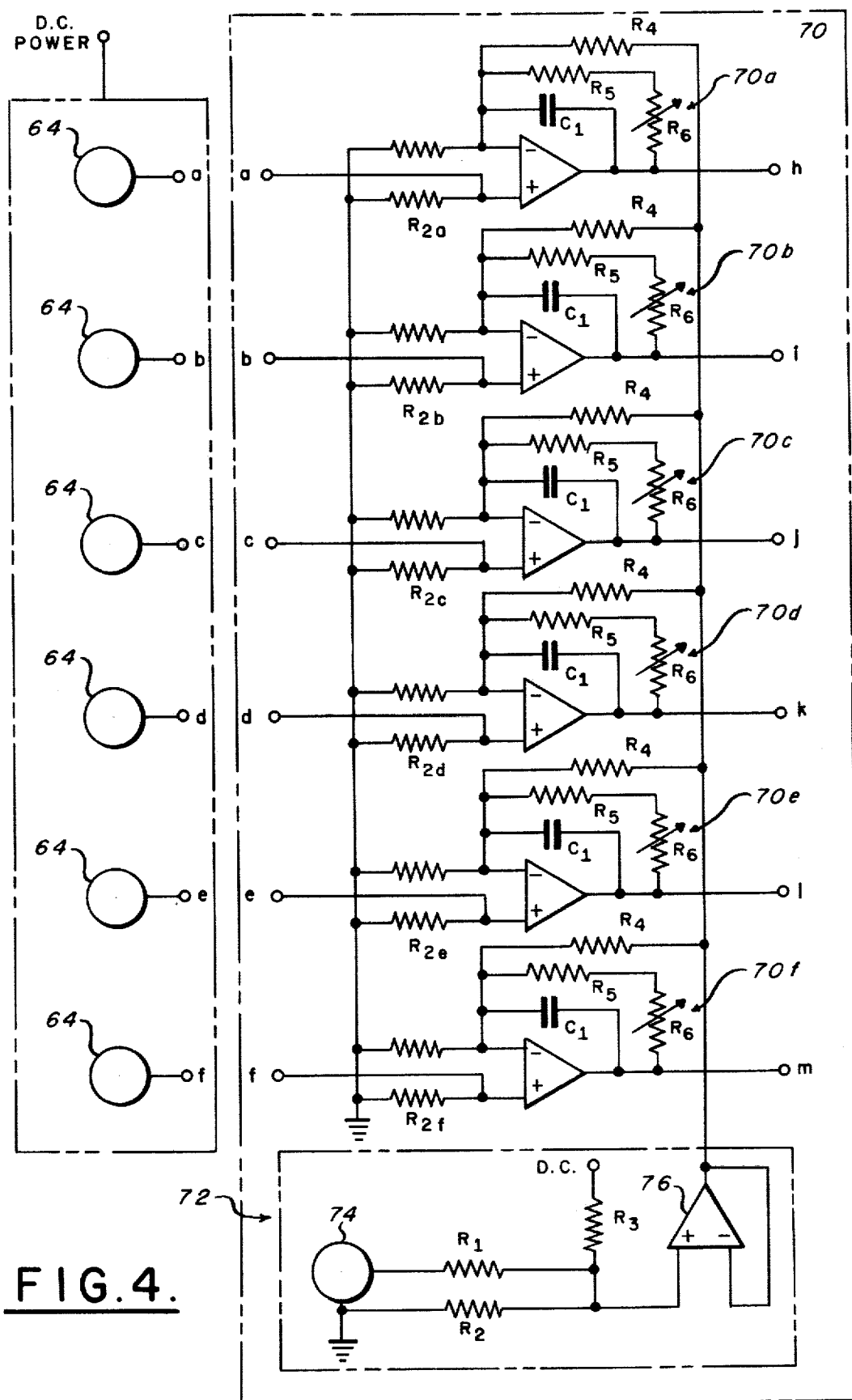
FIGS. 4 through 8 are circuit diagrams of portions of the block diagram of FIG. 2.

Attention is now invited to FIG. 4 wherein the sensor means 52 is shown including a plurality of wind sensors 64, one each for each sieve 46 section $S_1$ through $S_6$. Each wind sensor 64 is coupled by leads a through f to the equalizing means 58. Equalizing means 58 includes respective amplifier means $70a$ through $70f$, for each wind sensor 64, and a temperature bias means 72. The temperature bias means 72 includes a temperature sensor 74 disposed within the combine C, preferably within the vicinity of the cleaning means 28. The temperature sensor 74 is preferably an unheated thermistor exposed to the air temperature within the combine. The temperature sensor 74 is coupled in series with a resistor $R_1$ and the combination thereof is coupled in parallel with a resistor $R_2$. One terminal of sensor 74 and resistor $R_2$ is grounded, whereas the other terminal of resistor $R_2$ is coupled in parallel to a resistor $R_3$ which is coupled to a D.C. supply not shown. The parallel combination of resistors $R_1$, $R_2$, $R_3$ and sensor 74 is coupled to the non-inverting terminal of an amplifier 76. The inverting terminal of amplifier 76 is coupled to the output of amplifier 76 in a voltage follower manner. The output of the amplifier 76 is coupled to the inverting terminal of each amplifier means $70a$ through $70f$ through respective resistor $R_4$ for each amplifier means for purposes explained hereinbelow.

In the preferred embodiment of the invention, each wind sensor 64 of the sieve sections $S_1$ through $S_6$ is coupled by leads a through f, respectively, to the non-inverting terminal of its respective amplifier means $70a$ through $70f$. The amplifier means for each sensor 64 (a through f) each includes the resistor $R_4$ coupled to its inverting terminal, as explained above, a resistor $R_5$ coupled in feedback relation from the output terminal to the inverting terminal and a capacitor $C_1$ so coupled in feedback relation from the output terminal to the inverting terminal. In addition, the amplifier means of all but one wind sensor 64 (in the embodiment shown, the amplifier means $70a$) include a variable resistor $R_6$ series coupled to resistor $R_5$. The respective amplifier means for each sensor 64 (a through f) each includes a resistor $R_{2a}$ through $R_{2f}$, respectively, having one terminal coupled to the non-inverting terminal of the respective amplifier means $70a$ through $70f$ and the other terminal coupled to ground. The inverting terminal of respective amplifier means $70a$ through $70f$ is coupled to ground through a respective resistor $R_{1a}$ through $R_{1f}$. As explained hereinabove, at a constant supply voltage, the PTC thermistor current is proportional to the heat loss from the thermistor. Accordingly, the respective thermistor signal of sensors 64 (a through f) coupled to respective amplifier means is directly responsive to the thermistor current flowing through respective resistors $R_{2a}$ through $R_{2f}$. The output lead of each respective amplifier means is labelled h through m respectively.

Figure 5:
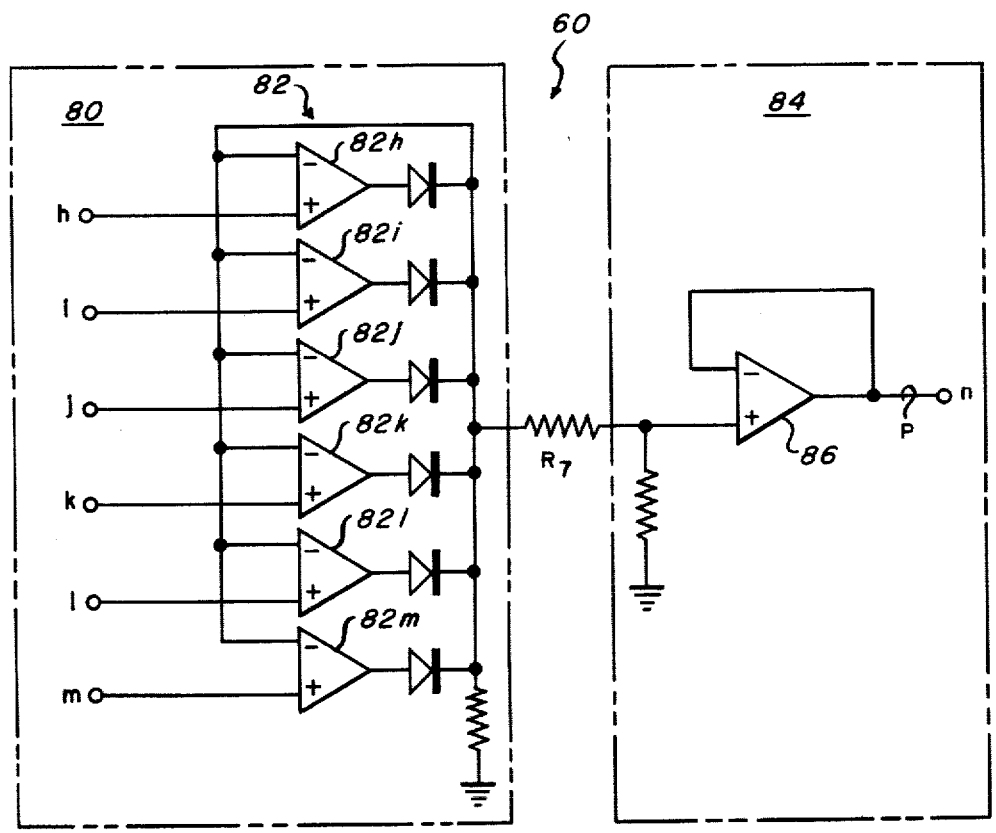

The output of the equalizer 58 is coupled to threshold means 60 and more specifically the respective outputs h through m are coupled to a maximum signal circuit 80 FIG. 5. The maximum signal circuit 80 includes respective amplifier and diode combination $82h$ through $82m$ having the diode outputs coupled together and the combination coupled to the inverting terminal of each of the amplifiers and ground such that the output of the combination represents the output from a perfect diode. The non-inverting terminal of the respective amplifiers is coupled to the output (h-m) of respective amplifier means and, accordingly, the output signal from each individual wind sensor 64 of this preferred embodiment of the invention is coupled through its respective amplifier means $70a$ through $70f$ to a respective amplifier-diode combination $82h$ through $82m$ via its respective lead (h through m), FIGS. 4 and 5.

The output of the maximum signal circuit 80 is coupled through a resistor $R_7$ to a circuit 84, which includes a resistor $R_8$ and an amplifier 86 connected as a voltage follower, having an output lead n. One terminal of the resistor $R_8$ is coupled to a terminal of resistor $R_7$ and the non-inverting terminal of the amplifier 86, the outer terminal of resistor $R_8$ is coupled to ground such that resistors $R_7$ and $R_8$ are coupled in a common voltage divider manner.

Figure 6:
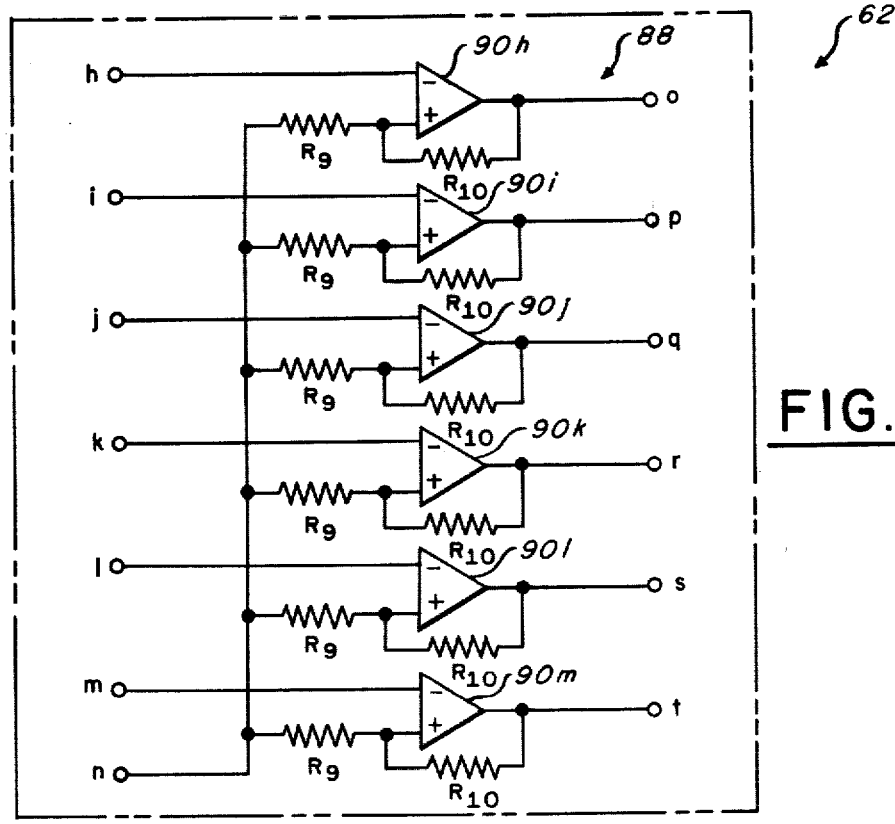

Attention is now invited to FIG. 6 wherein the detector means 62 is shown having input leads h through m coupled to corresponding leads (h through m) of equalizer 58 and an input lead n coupled to the output of threshold means 60 or more specifically output lead n of the circuit 84. The detector means 62 comprises a comparator circuit 88 and, as shown in this preferred embodiment of the invention, a comparator circuit $88h$ through $88m$ for each input lead h through m, i.e., for each respective wind sensor 64. Each respective comparator circuit 88 comprises an amplifier 90h through m each having is inverting terminal coupled to the respective input lead (h through m) of equalizer 58 and its non-inverting terminal coupled to the input lead n from the limiter circuit 84 through a resistor $R_9$. The output of each respective amplifier is coupled through a resistor $R_{10}$ to the non-inverting terminal. The respective outputs o through t of amplifiers 90h through 90m of the comparator circuit 88 are coupled to the warning means 56, as explained hereinbelow.

Figure 7:
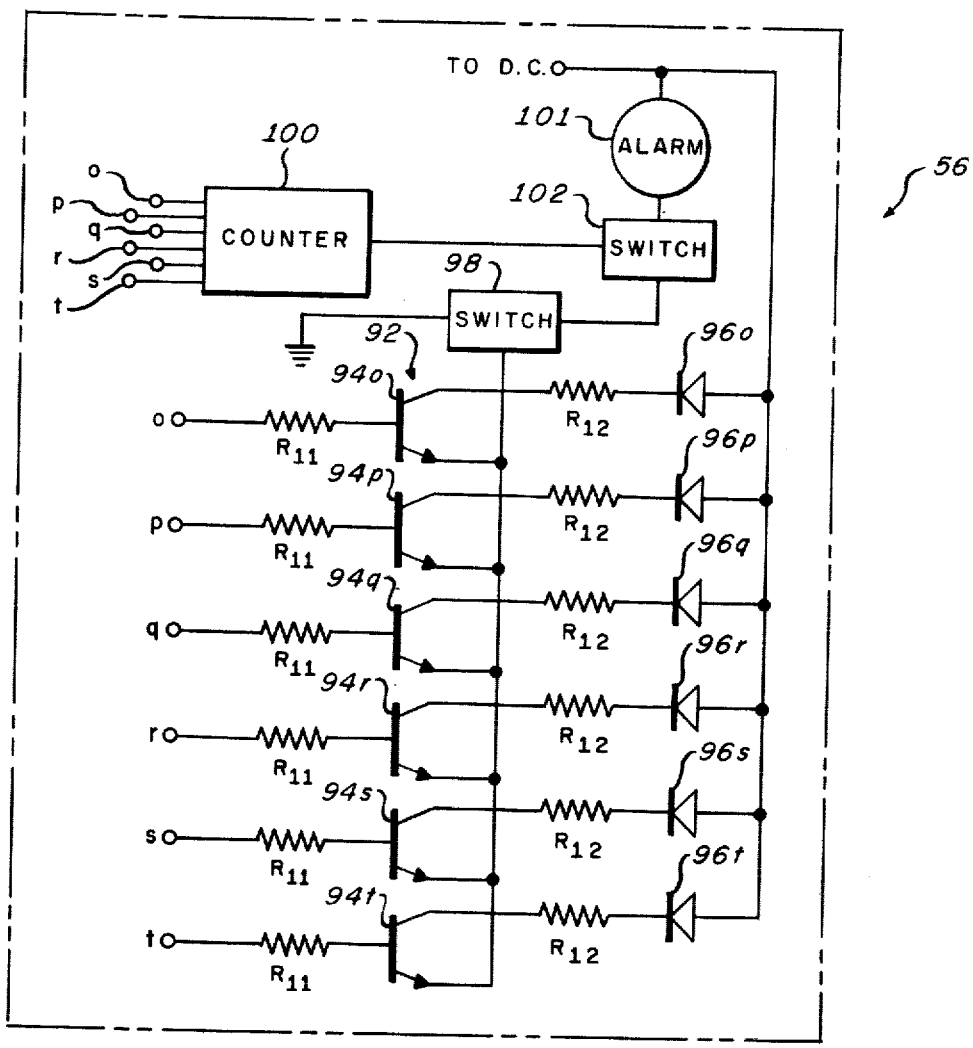

The warning means 56 (FIG. 7) comprises switch means 92 responsive to the output from the detector 62. The switch means 92 comprises respective transistors 94o through 94t, one for each wind sensor 64 for each sieve location $S_1$ through $S_6$ having its base electrode coupled through a resistor $R_{11}$ to the respective input lead (o through t) from the comparator circuits 88. The warning means 56 further comprises a signaling device, such as a plurality of light emitting diodes 96o through 96t coupled to a direct current power supply D.C. not shown and to the respective collector terminals of the transistors 94o through 94t via a resistor $R_{12}$. The emitter terminal of the respective transistors is coupled to ground through a switch 98.

In this preferred embodiment of the invention, the warning means 56 further comprises a counter 100 which in this embodiment of the invention is an analog type counter responsive to the output leads o through t from detector 62 and an alarm device 101 which may be a light, a bell or horn or both coupled to a power supply not shown. The alarm device is also coupled to the counter 100 through a switch 102 and to ground through the switch 98.

In operation, the apparatus of this invention provides a warning signal to the operator of the combine of a sieve blockage or overload development, as described hereinbelow, although it is apparent that the apparatus of this invention could also provide in the alternative a signal to the fan 32 or other means within the combine to remove the blockage. In operation, the respective wind sensors 64, in particular, the positive temperature coefficient thermistors 64A are provided with power which heats the thermistor to a preselected operating temperature substantially below the flash temperature of the crop and straw material within the combine. The sensors 64 provide a signal, responsive to the heat transfer therefrom, as explained hereinabove, to the individual respective amplifiers 70a through 70f within the equalizer 58. In addition, the ambient temperature within the combine is sensed by the unheated thermistor sensor 74 of the temperature bias means 72, which provides a temperature bias signal Q to the inverting terminal of the amplifier 70. This temperature bias signal or offset voltage provides a temperature signal to the respective amplifiers which compensates the heat transfer signal from the respective thermistors for the ambient temperature within the combine and, therefore, the signal from each wind sensor 64 is independent of the ambient temperature within the combine. Further, this offset signal Q is such that although the heated wind sensors will produce a signal even when there is no wind or air flow, in a shutdown condition for example, the output signal from the respective amplifiers on leads h through m will go to zero. In this embodiment of the invention, the signal Q hs the form:

$$Q = Q_{20}\left(\frac{105 - T_A}{85}\right)$$

where
$Q_{20}$ is the value of Q at 20° C.,
$T_A$ is the temperature of air in the combine in degrees centigrade (°C.), and
105 and 85 are temperature values in (°C.), and
which is merely a corrected temperature signal, as a function of the combine air temperature.

It is noted that the convective heat transfer from or to a fluid to or from a heat transfer sensor is a function of the temperature and the fluid flow. As the sensor temperature signal has been compensated by the temperature bias signal or offset signal Q, the output from the respective amplifiers is a function of the fluid flow and, in particular, the square root of the wind speed.

As there are six sieve locations $S_1$ through $S_6$ in this preferred embodiment each having a respective wind sensor 64 producing an output on leads a through f, respectively, each amplifier 70a through 70f may produce different initial signals. Accordingly, balancing means, i.e., the variable resistors $R_6$ previously mentioned in connection with amplifiers 70b through 70f are adjusted to balance the output signal from these respective amplifiers to the output signal of amplifier 70a. It is apparent that this operation may be performed by any standard or general electrical balancing or comparison technique. Upon completion of the balancing of the respective individual signals from the plurality of amplifier-sensor combinations to one particular amplifier-sensor combination, the output from all of the amplifier sensors will be insensitive to uniform disturbances, such as changes in combine fan, wind speed, as well as to changes in combine air temperatur, as previously indicated.

The output signals from the respective amplifers 70a through 70f are coupled via respective leads h through m to the maximum signal circuit 80, or to the respective amplifier-diode combinations 82h through 82m such that the maximum output signal from leads h through m is coupled to the circuit 84. Although it is noted that initially the amplifiers 70a through 70f are balanced to provide uniform signals, in the event that a blockage occurs locally in the sieves 46, the respective wind sensor 64 associated with that location will detect that blockage and provide a reduced signal.

The output signal from the maximum signal circuit 80 is coupled through resistors $R_7$ and $R_8$ in a voltage divider fashion preselected to produce a preselected output signal magnitude from amplifier 86 of circuit 84. This preselected signal magnitude represents the lower limit signal, based on the minimum wind speed, which the apparatus will sense without setting off the alarm. For example, in the preferred embodiment shown herein, the voltage divider resistors $R_7$ and $R_8$ were preselected to produce an output signal P from amplifier 86 equal to 0.633 times the maximum signal G of circuit 80. This signal P=0.633 G, it is noted, is substantially equivalent to a 60% loss in wind speed as measured by wind sensors 64 as the signal thereof is a function of the square root of wind speed.

The output signals from respective amplifiers 70a through 70f and amplifier 86 are coupled to the detector 62, i.e., to respective comparator circuits 88h through m, as previously explained, wherein the wind sensor signals are each compared to the lower limit signal P (0.633 G) by the respective comparator circuits. The output signal from the respective comparator circuits are each coupled to the warning means 56 for alerting the operator if the lower limit signal is greater than the wind sensor signal.

For example, assume that a localized sieve blockage has occurred at the sieve location associated with wind sensor 64 coupled to lead f. Accordingly, as the output of the respective amplifier 70f associated therewith is a function of the square root of the wind speed, the output signal thereof will be reduced from the signals associated with the amplifier-sensor combinations not so blocked. Thus, if the output signal of the blocked amplifier-sensor of lead f is 0.5 that of the remaining amplifier-sensor signals G, the following occurs. The maximum signal circuit 80 and limiter circuit 84 produce a predetermined signal of 0.633 G. The detector circuit 62 compares each respective input signal from the respective amplifiers 70a through 70f with the lower limit signal of lead n to detect a fault, i.e., a blockage. As the signals from the wind sensors 64 on leads a through e are all approximately equal to G, these signals when compared to the lower limit signal 0.633 G are greater than the lower limit and a LOW output or negative polarity output signal is produced by the comparator circuits 88h through 88l and is coupled to leads o through s. The low or negative polarity output signals reverse biases the respective transistors 94o through 94s preventing conduction. As there is no conduction through the transistors, the respective light emitting diodes 96o through 96s do not illuminate, as there is no blockage in their respective sieve sections to which the operator should be alerted. However, as the signal from lead f of a blocked sieve section is assumed equal to 0.5 G (for this illustration), the comparator circuit 88m associated therewith through lead m will produce a HIGH or positive polarity signal when compared to the lower limit signal 0.633 G. The HIGH or positive polarity signal from the comparator 88 is coupled via lead t to the respective transistor 94t coupled therewith. The HIGH signal forward biases the transistor allowing it to conduct, thereby causing the respective light emitting diode to illuminate and warn the operator of a sieve blockage at that respective sieve location in order that appropriate action may be taken. Thus, the sensing means is used to detect the airstream gradient at the sieves.

In addition, if one particular sieve location is not significant enough to alert the operator to pursue appropriate action, a counter 100 coupled to the comparator circuits via respective leads o through t may count the number of sieve locations which are blocked as determined by the output signals on leads o through t and apply an appropriate signal when the preselected number of blocked sieves is established. The signal from the counter merely turns "ON" the switch 102 allowing the alarm 101 to respond to alert the operator. Switch 98, moreover prevents the alarm from working at the low wind speed which would occur when the fan is not operating.

Figure 8:
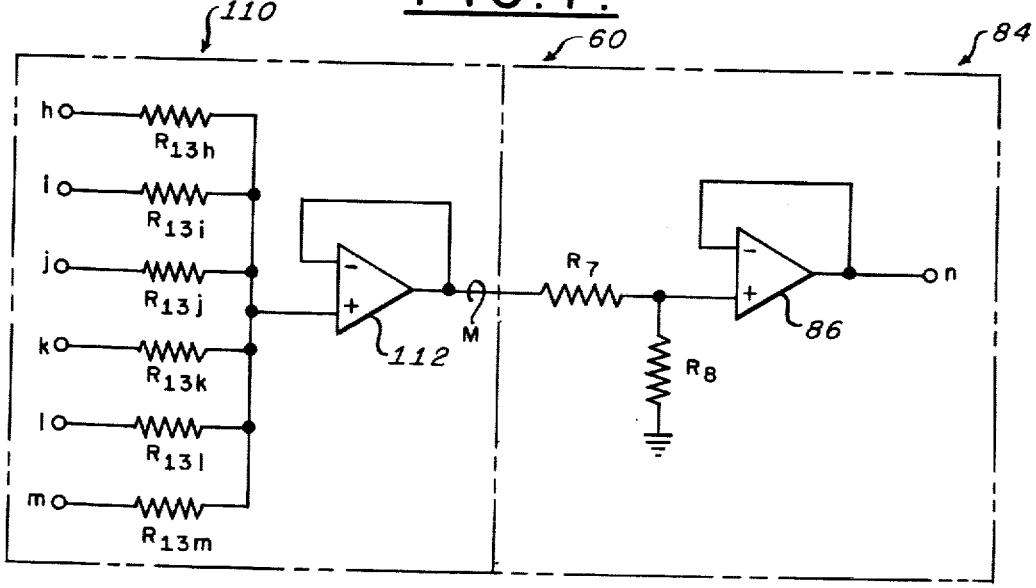

Attention is invited to FIG. 8 in which the threshold means 60 includes an average signal circuit 110 comprising input leads h though m from the respective output of amplifiers 70a through 70f coupled through respective resistors $R_{13}$ to the non-inverting terminal of an amplifier 112 coupled as a voltage follower, for providing a signal M based on the average of the input signals from the respective wind sensors. In this embodiment, the voltage divider resistors $R_7$ and $R_8$ and amplifier 86 of circuit 84 produce a preselected output signal of 0.707 M. This output signal is equivalent to a 50% reduction or loss in wind speed.

In accordance with this invention, apparatus for sensing the blockage of the sieves and alerting the operator is provided.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a combine harvester having grain cleaning means which includes fan means for providing an airflow and sieve means which is separated into a plurality of cooperating longitudinal sections, an apparatus for detecting a blockage of said sieve means comprising:
   (a) a plurality of wind sensors responsive to the airflow through the cooperating longitudinal sections of said sieve means;
   (b) at least one wind sensor not responsive to the airflow through the cooperating longitudinal sections of said sieve means;
   (c) means for balancing output signals from said plurality of wind sensors;
   (d) means for biasing the balanced output signals from said plurality of wind sensors with an output signal from said wind sensor not responsive to the airflow through the cooperating longitudinal sections of said sieve means;
   (e) means for establishing a threshold signal for said sieve means which is a function of the biased output signals from said plurality of wind sensors;
   (f) detector means for comparing said biased output signals from said plurality of wind sensors to said threshold signal; and
   (g) warning means responsive to said detector means for alerting the operator to a blockage developing anywhere on said sieve means.

2. An apparatus according to claim 1 wherein said threshold signal is approximately 0.633 of the maximum biased output signal from said plurality of wind sensors.

3. An apparatus according to claim 1 wherein said threshold signal is approximately 0.707 of the average of said biased output signals from said plurality of wind sensors.

4. An apparatus according to claims 2 or 3 wherein said plurality of wind sensors includes positive temperature coeffient thermistors disposed in the rearward portion of said sieve sections.

5. An apparatus according to claim 4 wherein said sieve means is separated into a plurality of cooperating longitudinal sections by a plurality of slats.

* * * * *